Feb. 17, 1925.
W. A. STARCK
1,526,511
AUTOMOBILE BUMPER BRACKET
Filed Nov. 17, 1923
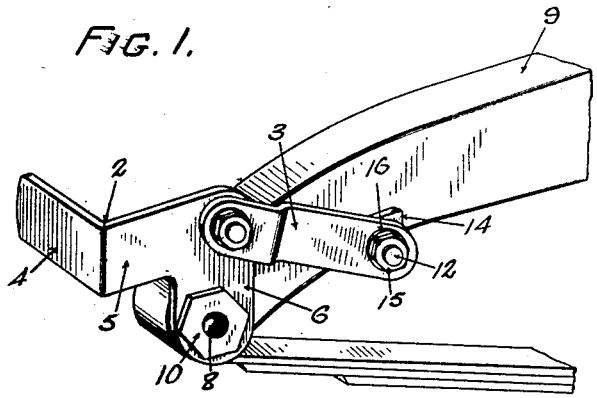
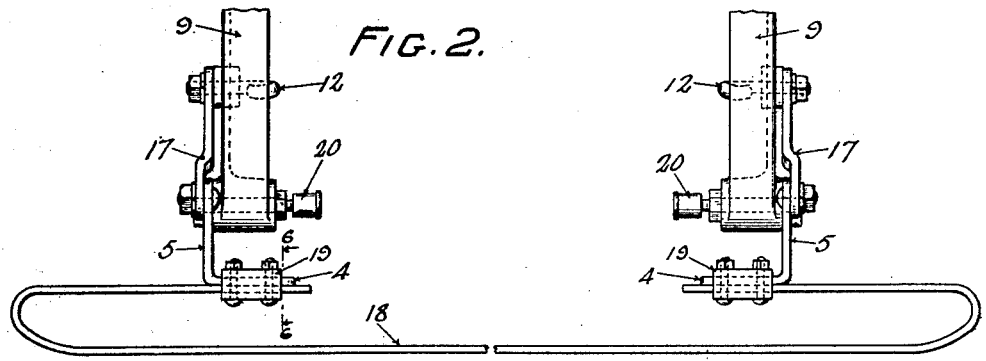
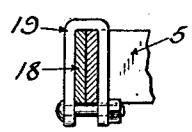
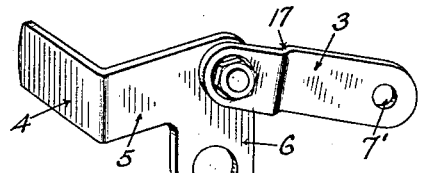
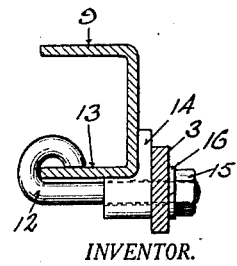
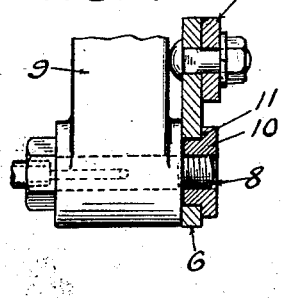
INVENTOR.
William A. Starck.
BY
Edwin B. H. Tower, Jr.
ATTORNEY.

Patented Feb. 17, 1925.

1,526,511

UNITED STATES PATENT OFFICE.

WILLIAM A. STARCK, OF MILWAUKEE, WISCONSIN, ASSIGNOR TO BADGER MANUFACTURING CORPORATION, OF MILWAUKEE, WISCONSIN, A CORPORATION OF DELAWARE.

AUTOMOBILE BUMPER BRACKET.

Application filed November 17, 1923. Serial No. 675,293.

*To all whom it may concern:*

Be it known that I, WILLIAM A. STARCK, a citizen of the United States, residing at Milwaukee, in the county of Milwaukee and State of Wisconsin, have invented new and useful Improvements in Automobile Bumper Brackets, of which the following is a specification.

This invention relates to an automobile bumper bracket. It relates particularly to a bracket for attaching bumper bars to an automobile frame.

An object of the invention is to provide an automobile bumper bracket which may be attached to automobile frames of various sizes and degrees of curvature.

Another object is to provide an automobile bumper bracket which may be pivotally attached to the shackle bolt of an automobile frame and may be adjusted to a vertical position on frames having varying degrees of curvature.

Another object is to provide an automobile bumper bracket which may be pivotally attached to the shackle bolt of an automobile frame and adjustably braced and connected to another portion of the frame.

Other objects and advantages will hereinafter appear.

The invention contemplates a bracket member having means for connecting the same to an automobile frame and means for attaching a bumper thereto, and a brace member pivotally connected to that part of the bracket forming the connecting means to the automobile frame.

In the drawings:

Fig. 1 is a view in perspective showing a bumper bracket attached to an automobile frame.

Fig. 2 is a plan view showing a pair of automobile bumper brackets attached to an automobile frame and supporting a bumper.

Fig. 3 is a view in perspective showing the automobile bumper bracket.

Fig. 4 is a view showing a detail of means for attaching the bracket to the frame of an automobile with the shackle bolt.

Fig. 5 is a view showing in detail how the bracing member may be attached to a point on the frame away from the shackle bolt.

Fig. 6 is a cross-sectional view through line 66 of Fig. 2.

A bumper bracket may comprise a supporting member 2 and a bracing member 3.

The supporting member 2 comprises a bumper attaching portion 4 supported by a backwardly bent portion 5 and a vertical arm 6, which portions and arm may be integrally connected to each other.

The vertical arm 6 is provided with a hole 7 for attaching the bracket with the shackle bolt 8.

The arm 6 may be attached to the frame 9 of an automobile by means of a flanged nut 10 fitted in the hole 7 and engaging the shackle bolt 8, thus securing the arm 6 between the frame 9 and the flange 11.

While the bracket has been shown and described as pivotally connected to an automobile by means of the shackle bolt, it is to be understood that it may be pivotally connected by other means and that the invention is not limited to the pivotal connection of the shackle bolt.

The upper end of the arm 6 is pivotally connected to one end of the bracing member 3. The other end of the bracing member 3 is provided with a hole 7', and may be secured to the frame 9 by means of the hook bolt 12 engaging the lower flange 13 of the frame 9 and supporting the spacer 14, bracing member 3 and a nut 15 held by lockwasher 16.

Other means of adjustably securing the bracing member 3 to the frame 9 may be employed, and it is to be understood that the invention is not limited to the specific means of adjustably securing the bracing member to the frame.

The bracing member 3 may have offset portion 17 to align the main body of the bracing member 3 with the backwardly bent portion 5 and the vertical arm 6 of the supporting member 2.

The bumper 18 is secured to the portion 4 by means of U-shaped clamping bars 19.

The bumper attaching portion 4 may have its face adjusted to a vertical position by moving the hook bolt 12 backward or forward on the lower flange of the frame 9 until the proper position for attaching portion 4 is obtained.

When the bumper attaching portion 4 has been placed in vertical position, the nut 15 may be tightened to clamp the rear end of the bracing member 3 securely to the frame 9.

The shackle of the frame 9 may be provided with lubricating means 20 on the opposite side of the shackle from the bumper bracket.

This invention is, of course, susceptible of various other modifications and adaptations.

What I claim is:

1. An automobile bumper bracket comprising a bumper supporting member, and a bracing member, said bumper supporting member having a transverse bumper attaching portion and a rearwardly and downwardly disposed supporting portion, said bracing portion having means at its ends for securing it to an automobile frame and to the rearwardly disposed supporting portion.

2. An automobile bumper bracket comprising a bumper attaching member, and a bracing member, said bumper attaching member having a vertical bumper attaching face to be transversely disposed relatively to an automobile frame and a vertical supporting portion to be longitudinally disposed relatively to said automobile frame and having means at its lower end for pivotal attachment to the shackle bolt of said automobile frame, said bracing member being pivotally connected at one end to said vertical supporting portion and having means at its other end for attachment to said automobile frame.

3. An automobile bumper bracket comprising a bumper attaching and supporting member, and a bracing member pivotally connected at one end to said attaching and supporting member, said attaching and supporting member comprising an integral bar having a vertical portion to be pivotally connected at its lower end to the shackle bolt of an automobile frame and extending forwardly and laterally at its upper end to provide a bumper attaching portion, said bracing member having means for attachment to the automobile frame and to the vertical portion of the supporting member.

4. An automobile bumper bracket comprising a bar having means for pivotal engagement with the shackle bolt of an automobile frame and having an upwardly and laterally extending portion, and a bracing member pivotally connected to said upwardly extending portion and having means for adjustable connection to the automobile frame.

5. An automobile bumper bracket comprising two members pivotally connected intermediate the ends of one of said members, one of said members having means for pivotal attachment at one end to the shackle bolt of an automobile and having a laterally bent portion for attachment to a bumper, the other of said members having means for adjustable attachment to the frame of said automobile.

6. A bracket for attaching a bumper to an automobile frame comprising bars pivotally connected intermediate the ends of one of said bars, one of said bars having a lateral portion for attachment to a bumper and having means at the other end for pivotal attachment to the automobile frame, the other of said members having means for adjustable attachment to the automobile frame.

7. An automobile bumper bracket comprising a bumper attaching member, and a bracing member, said bumper attaching member having a vertical bumper attaching face to be transversely disposed relatively to an automobile frame and a vertical supporting portion to be longitudinally disposed relatively to said automobile frame and having means at its lower end for pivotal attachment to the shackle bolt of said automobile frame, said bracing member being pivotally connected at one end to said vertical supporting portion and having means for adjustable attachment to said automobile frame.

8. An automobile bumper bracket comprising a bumper attaching member, and a bracing member, said bumper attaching member having a vertical bumper attaching face to be transversely disposed relatively to an automobile frame and a vertical supporting portion to be longitudinally disposed relatively to said automobile frame and having means at its lower end for pivotal attachment to the shackle bolt of said automobile frame, said bracing member being pivotally connected at one end to said vertical supporting portion and having hook means for adjustable attachment to said automobile frame.

9. An automobile bumper bracket comprising a flat bar having an edgewise extension for pivotal attachment to an automobile frame and a flatwise extension for attachment to a bumper, and a bar pivotally connected to said first mentioned bar and having means for adjustable attachment to said frame.

10. An automobile bumper bracket comprising a flat bar having an edgewise extension for pivotal attachment to an automobile frame and a flatwise extension for attachment to a bumper, and a flat bar pivotally connected to said first mentioned bar and having means for adjustable attachment to said frame.

11. An automobile bumper bracket comprising a flat bar having an edgewise extension for pivotal attachment to an automobile frame and a flatwise extension for attachment to a bumper, and a bar pivotally connected at one end to said first mentioned bar and having means at the other end for adjustable attachment to said frame.

In witness whereof, I have hereunto subscribed my name.

WILLIAM A. STARCK.